United States Patent [19]

Bewers

[11] 4,438,826
[45] Mar. 27, 1984

[54] TILT CAB SUPPORT STAY

[75] Inventor: Ronald Bewers, Maldon, England

[73] Assignee: Ford Motor Company, Dearborn, Mich.

[21] Appl. No.: 283,578

[22] Filed: Jul. 15, 1981

[30] Foreign Application Priority Data

Jul. 30, 1980 [GB] United Kingdom ............... 8024966

[51] Int. Cl.³ ............................................. B62D 23/00
[52] U.S. Cl. .................................. 180/89.14; 292/263; 403/109; 180/89.16
[58] Field of Search ............... 180/89.13, 89.14, 89.15, 180/89.16; 403/109, 54, 61, 63, 94, 97, 108, 120; 292/263, 265, 268, 269, 271, 272, 273; 217/60 E; 16/348, 352

[56] References Cited

U.S. PATENT DOCUMENTS

| | | | |
|---|---|---|---|
| 2,362,453 | 11/1944 | Cosper | 180/89.14 |
| 2,566,182 | 8/1951 | Flynn | 292/267 |
| 2,947,376 | 8/1960 | Norrie | 180/89.15 |
| 3,093,258 | 6/1963 | Turner | 217/60 E |
| 3,141,694 | 7/1964 | Birmingham | 292/263 |
| 3,359,028 | 12/1967 | Seckerson | 292/263 |

Primary Examiner—Robert B. Reeves
Assistant Examiner—Dennis H. Pedder
Attorney, Agent, or Firm—Daniel M. Stock; John J. Roethel; Clifford L. Sadler

[57] ABSTRACT

A stay can be used to support a cab of a tilt cab vehicle selectively in a first raised position in which the cab has been pivoted through an angle of, for example, 40° and the stay is in compression, and in a second raised position in which the cab has been pivoted through a larger angle of, for example, 50° and the stay is in tension. The stay comprises an arm pivoted to the cab and an arm pivoted to the vehicle frame. The ends of the arms overlap and are connected by means of a pin which passes through specially shaped slots extending in each arm. The pin is formed with offset pairs of flats which cooperate with the slots in the arms, and the pin can be rotated by a lever which controls operation of the stay.

6 Claims, 15 Drawing Figures

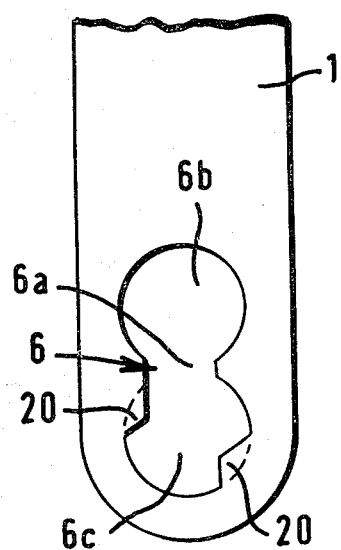
FIG. 2
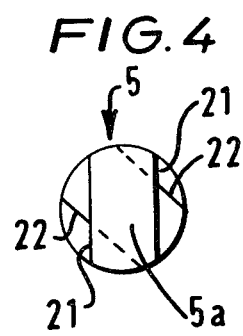
FIG. 4
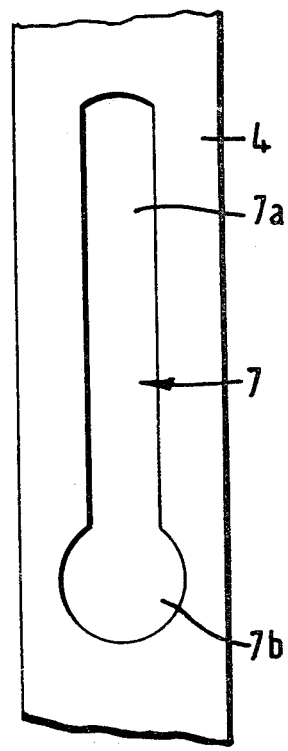
FIG. 3
FIG. 5
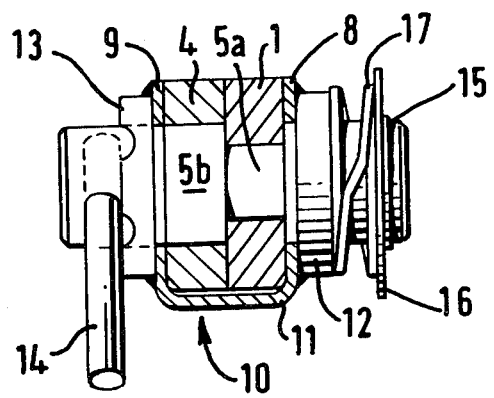

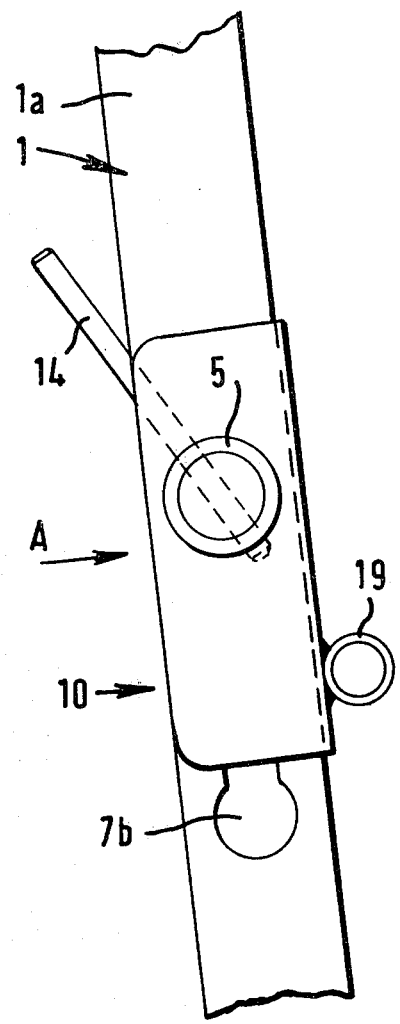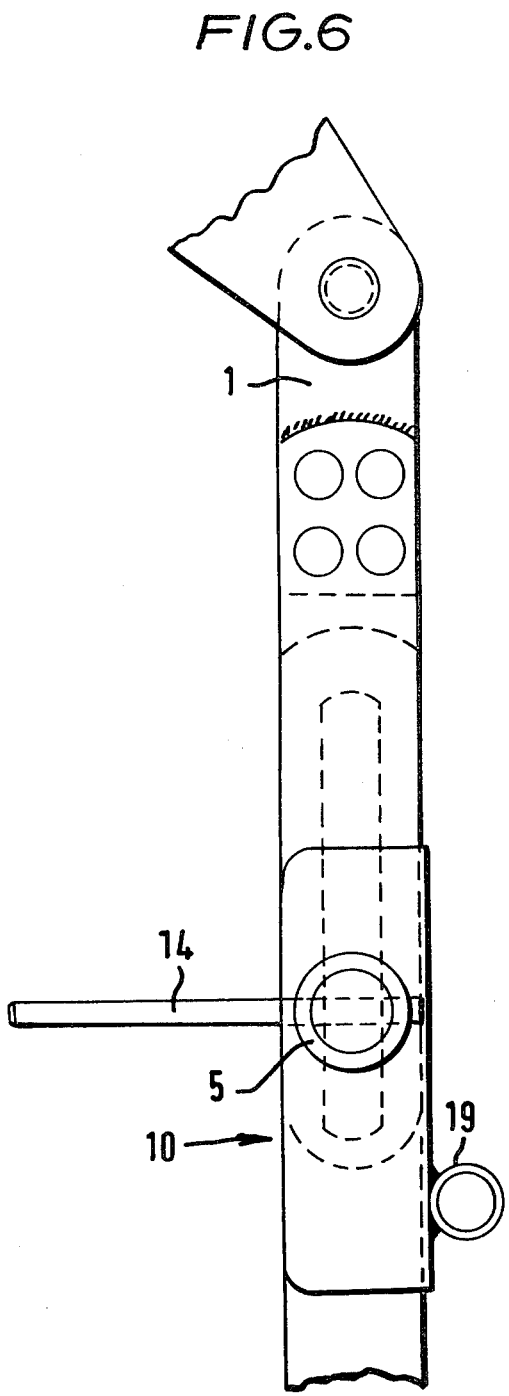
FIG.6
FIG.7

TILT CAB SUPPORT STAY

This invention relates to a "tilt cab" vehicle, and also to a stay suitable for use in propping the cab of such a vehicle in a raised position. A "tilt cab" vehicle is a vehicle having a cab which can be pivoted and thus raised relative to a frame of the vehicle to give access to parts of the vehicle requiring servicing or repairing.

BACKGROUND OF THE INVENTION

A known two-armed cab stay comprises one arm pivotally connected to a vehicle cab and another arm pivotally connected to the vehicle frame, the two arms being pivotally connected to each other. As the cab is raised the two arms straighten out to lie in line, and they are then manually pushed through the "in line" or "dead center" position to take up a stable position in which the cab is supported. In its raised supported position the cab has been pivoted through an angle of about 45° relative to its normal lowered position which it occupies when the vehicle is being driven.

An object of the invention is to provide a tilt cab vehicle having a cab stay which has several advantages as compared with the known arrangement described above, which advantages will become apparent from the following description.

SUMMARY OF THE INVENTION

According to one aspect of the present invention there is provided a tilt cab vehicle having a cab pivotally connected to a frame of the vehicle so that the cab can be pivoted and thus raised from a lowered position which it occupies when the vehicle is to be driven, a stay being provided for supporting the cab selectively in each of a first raised position in which the cab has been pivoted through a first angle from its lowered position and a second raised position in which the cab has been pivoted through a second and larger angle from its lowered position.

Preferably, when the cab is in its first raised position and the vehicle stands on a horizontal surface, the stay supporting the cab is under compression due to the force of gravity acting on the cab, whereas when the cab is in its second raised position and the vehicle stands on a horizontal surface, the stay supporting the cab is under tension.

With this preferred arrangement, the vehicle's driver can raise the cab to its first raised position to give limited access to vehicle components, for example for emergency roadside repairs. From this first raised position the cab can be returned by the driver alone to its lowered position. The cab would normally only be raised to its second raised position giving greater access when two men are available to return the cab to its lowered position, since movement of the cab from its second raised position would initially be against the force of gravity.

It is very desirable to provide means to prevent the cab from being inadvertantly raised to its second raised position. Such means may comprise a member movable to control operation of the stay, the control member having a position to which it is automatically moved when the cab is raised to its first raised position, in which position of the control member the cab cannot be raised to its second raised position.

Preferably the control member has a further position to which it may be moved selectively, in which further position the stay is locked and the cab cannot be raised or lowered.

In the embodiment described below, the control member can be moved to another position in which the cab can be raised from its first raised position to its second raised position.

The invention also relates to a stay suitable for use with the cab, but which can be also used for other purposes. Thus, according to another aspect of the invention there is provided a stay having a collapsed position, a first supporting position in which the stay has a first length, and a second supporting position in which the stay has a second and longer length, the stay comprising first and second arms, a pin, and a channel member having two spaced apart side walls connected by an end wall or web, the two arms having first end regions to be connected to respective members between which the stay is to extend, and second end regions formed with longitudinally extending slots, the slotted end regions of the arms overlapping one another and being disposed between the side walls of the channel member, the pin extending between the side walls of the channel member and passing through the slots to thus connect the arms together, the pin being rotatably mounted and having a first axial portion which lies in the slot in the first arm, and a second axial portion which lies in the slot in the second arm, both axial pin portions being of non-circular cross-section, each slot having a wider portion in which the respective axial pin portion is freely rotatable, and a narrower portion in which the respective axial pin portion can enter only when correctly aligned therewith, the wider portion of each slot being at the end thereof remote from the second end of the respective arm, the arrangement being such that in the collapsed position of the stay the pin passes through a said narrower slot portion of the first arm and through a said wider slot portion of the second arm, in the first supporting position of the stay the pin passes through a said wider slot portion of both arms, and in the second supporting position the pin passes through a wider slot portion of the first arm and through a narrower slot portion of the second arm.

DESCRIPTION OF THE DRAWINGS

In order that the invention may be more readily understood, one embodiment of a stay for fitting to a tilt cab vehicle according to the invention will now be described by way of example and with reference to the accompanying drawings, in which:

FIG. 2 is a side view of part of one arm of the stay to be secured to the cab, the view showing the shape of a slot formed in the end of the arm remote from the cab;

FIG. 3 is a side view of the other arm of the stay, which arm is to be secured to the vehicle frame, the view showing the shape of a slot formed in the end of the arm remote from the frame;

FIG. 4 is a cross-section view through a connecting pin which passes through the slots in both arms to link the arms together, the pin being formed with "flats";

FIG. 5 is a cross-sectional view through the stay in the region of the connecting pin as indicated by the line V—V in FIG. 1, the stay being shown however in a cab-supporting position thereof in FIG. 5;

FIG. 6 is a side view of the stay in a first cab-supporting position thereof in which it supports the cab in a partially raised position;

FIG. 7 is a view similar to FIG. 6, but showing the stay in a second cab-supporting position thereof in which it supports the cab in a fully raised position;

DETAILED DESCRIPTION OF THE INVENTION

Figure 1:
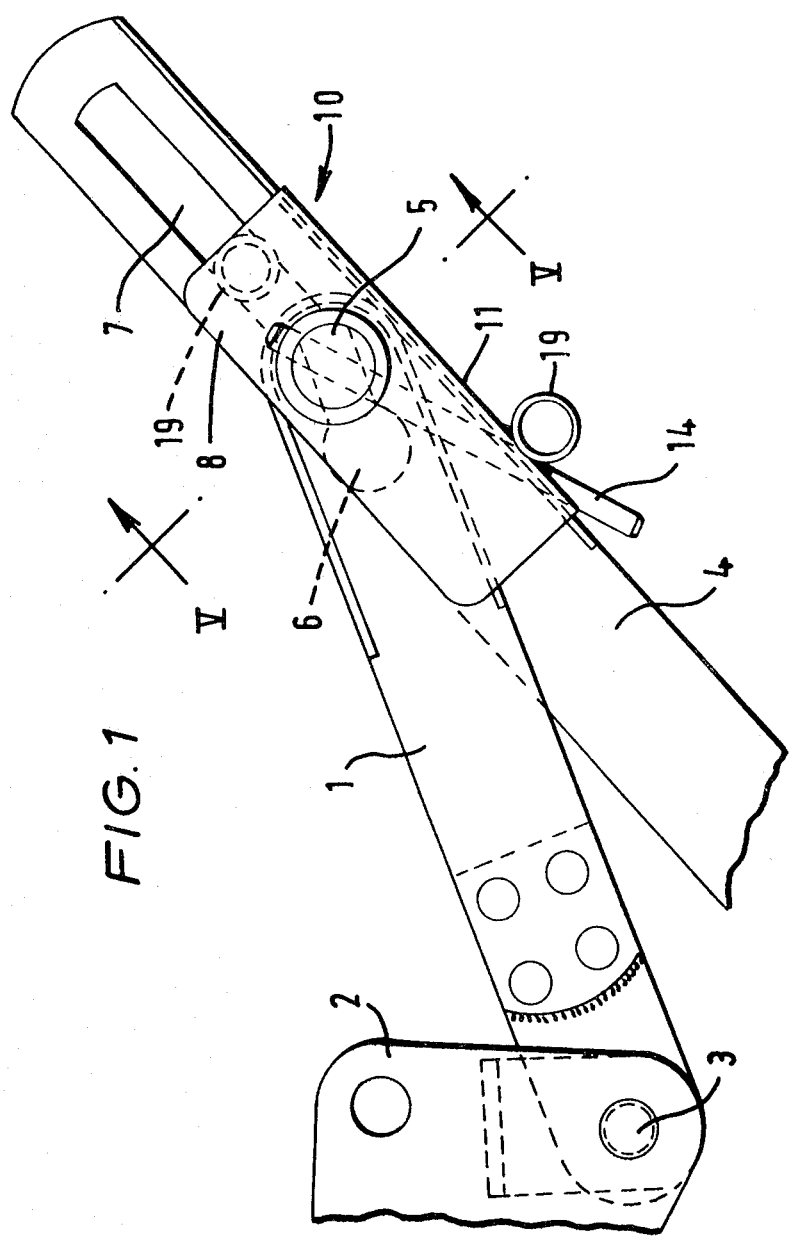
FIG. 1 is a side view of a two-armed stay according to the invention to be attached between the cab and frame of a tilt cab vehicle, the stay being shown in the position which it will occupy when the cab is in a lowered position thereof.

Referring to FIG. 1, the stay comprises two arms, i.e. a cab arm 1 and a frame arm 4. The cab arm 1 is pivotally connected to a cab (not shown) of a tilt cab vehicle by means of a bracket 2 secured to the cab and pivoted to the cab arm 1 by means of a pivot pin 3. The frame arm 4 is pivotally connected at its lower end (not shown) to the frame of the tilt cab vehicle. The positions of the cab arm and frame arm shown in FIG. 1 are approximately those which they will occupy when the stay is folded and the vehicle cab is not supported by the stay but is in a lowered position in which the vehicle can be driven.

The two arms are connected together by a connecting pin 5 which passes through slots in the arms, i.e. through a relatively short slot 6 in the cab arm 1 and through a longer slot 7 in the frame arm 4. The pin 5 can slide along the slots 6 and 7 in a manner to be described below, the pin being mounted through and between two side walls 8 and 9 of a channel member 10 best shown in FIG. 5. The two side walls 8 and 9 of the channel member are connected by an end wall or web 11 of the channel member. As FIG. 5 shows, bearings 12 and 13 for rotatably mounting the pin 5 are welded to the walls 8 and 9 of the channel member 10 on the outside of the channel member. The pin 5 projects beyond both bearings, the left hand end of the pin (as viewed in FIG. 5) being connected to an operating lever 14 which extends transversely from the pin 5, and the right hand end of the pin 5 being formed with a groove for a retaining clip 15. Between the retaining clip 15 and the bearing 12 are a washer 16 and a compression spring 17. The compression spring 17 serves to bias the pin 5 to move to the right so that the operating lever 14 is pressed against the outer surface of the bearing 13. The connecting pin 5 can be rotated by means of the pin-operating lever 14 in one position of the stay as will be explained below, and the outer surface of the bearing 13 has radial grooves 18 angularly spaced apart around the bearing to positively locate the operating lever in each of three specific positions disposed 60° apart.

It is important for correct operation of the stay to prevent the pin-operating lever from rotating in either direction (i.e. clockwise and anti-clockwise) beyond the two end positions, and for this reason two stops 19 (see FIG. 1) are provided spaced approximately 180° apart, these stops lying in the path of movement of the pin-operating lever 14.

The shape of the slots in the stay arms and of the shape of the pin 5 which connects these arms is best seen from FIGS. 2 to 4. The slot 7 in the frame arm 4 includes a relatively long narrow straight portion 7a which extends from an end region of the arm 4 parallel to such arm towards the pivot point of the arm, the slot terminating in a circular portion 7b. The slot 6 in the cab arm 1 is positioned at an end region of the arm remote from the pivot pin and extends parallel to the arm. The slot 6 comprises a very short straight portion 6a, a circular portion 6b which is disposed at the end of the slot portion 6a nearer to the pivot pin 3, and a slot portion 6c leading from the end of the straight slot portion 6a which is remote from the pivot pin 3. The shape of the slot portion 6c is part circular as indicated by the dotted lines in FIG. 2, but portions 20 of the arm 1 project into the generally circular slot portion 6c to constitute abutments for the pin 5 as will be explained below.

Figure 8:
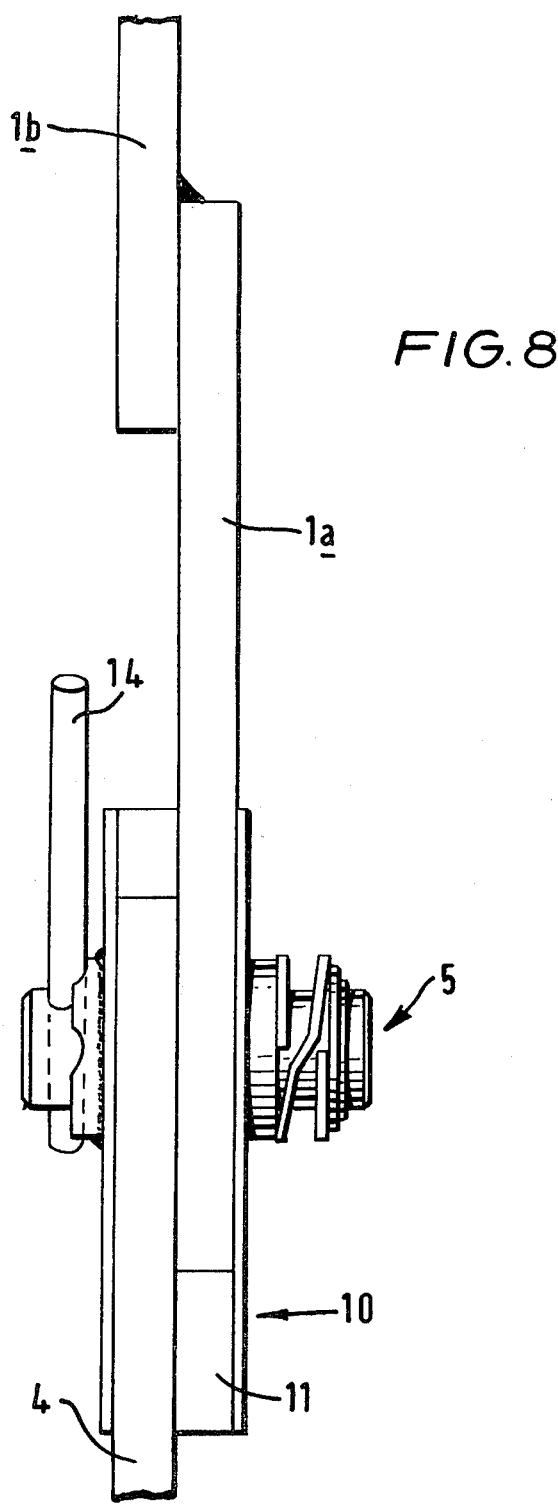
FIG. 8 is a view in the direction of the arrow "A" in FIG. 7.
Figure 9:
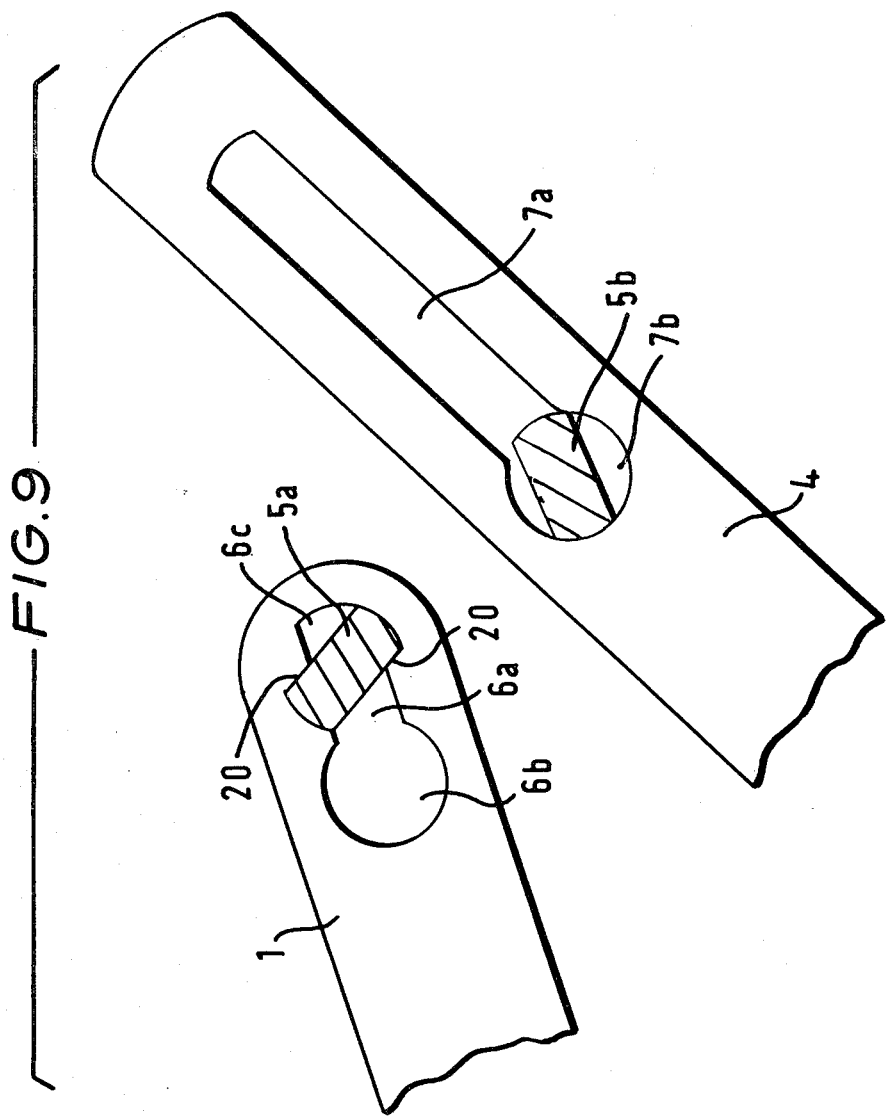
FIGS. 9 to 15 are views showing the approximate relative positions of the stay arms and the connecting pin in various positions of the stay.

The pin 5 is also of basically circular cross-section, and is of a diameter such that it can freely rotate in the slot portions 6b and 7b which are of mutually the same diameter. The part-circular slot portion 6c has the same diameter as the slot portion 6b. As best seen from FIGS. 4 and 5, the pin 5 has an axial portion 5a which is disposed in the slot 6 in the cab arm 1, and an axial portion 5b which is disposed in the slot 7 in the frame arm. The pin portion 5a is provided with a pair of mutually parallel flats 21, the spacing between the flats 21 being such that the pin portion 5a can slide along the short straight slot portion 6a when the flats 21 are aligned with this straight portion. Similarly, the pin portion 5b is provided with a pair of mutually parallel flats 22, the spacing between the flats 22 being such that the pin portion 5b can slide along the relatively long straight slot portion 7a when the flats 22 are aligned with such slot portion. As viewed in FIGS. 2 to 4 the flats 21 which co-operate with the slot in the cab arm 1 are disposed at an angle of approximately 60° clockwise relative to the flats 22 which co-operate with the slot in the frame arm 4, and it will be understood that when viewed in this direction the cab arm 1 will overlie the frame arm 4, as in the case of FIG. 1. As shown in FIG. 8, the cab arm 1 is constructed in two parts welded together. The part 1a is the part which is formed with the slot 6 and which overlies the frame arm 4. The part 1b is the part which is pivoted to the cab, the part 1b of the cab arm lying in the same plane as frame arm 4.

FIGS. 9 to 15 are a sequence of views which together with FIGS. 6 to 8 illustrate how the stay operates. For clarity in FIGS. 9 to 15, the cab arm and the frame arm are shown separated from one another, and the pin portions 5a and 5b formed with the flats have been shaded in. In viewing these figures it should be remembered that actually the cab arm 1 will overlie the frame arm 4.

Operation of the stay will now be described. In the "stay collapsed" or "cab lowered" position shown in FIG. 1, the arms 1 and 4 and the pin 5 are in the positions shown in FIG. 9. In this position the pin portion 5a lies in the part circular slot portion 6c of the slot 6, and the pin portion 5b lies in the circular portion 7b of slot 7. To raise the cab a catch (not shown) which normally holds the cab locked in a lowered position will be released, and the cab will be pivoted about its front end to thus raise the cab, i.e. to raise the rear end of the cab to which the cab arm 1 is pivoted. This will cause the cab arm 1 to pivot clockwise about the pin 5, but initially the pin 5 will not rotate because of the limited relative rotation available between the slot portion 6c and the pin portion 5a.

Figure 10:
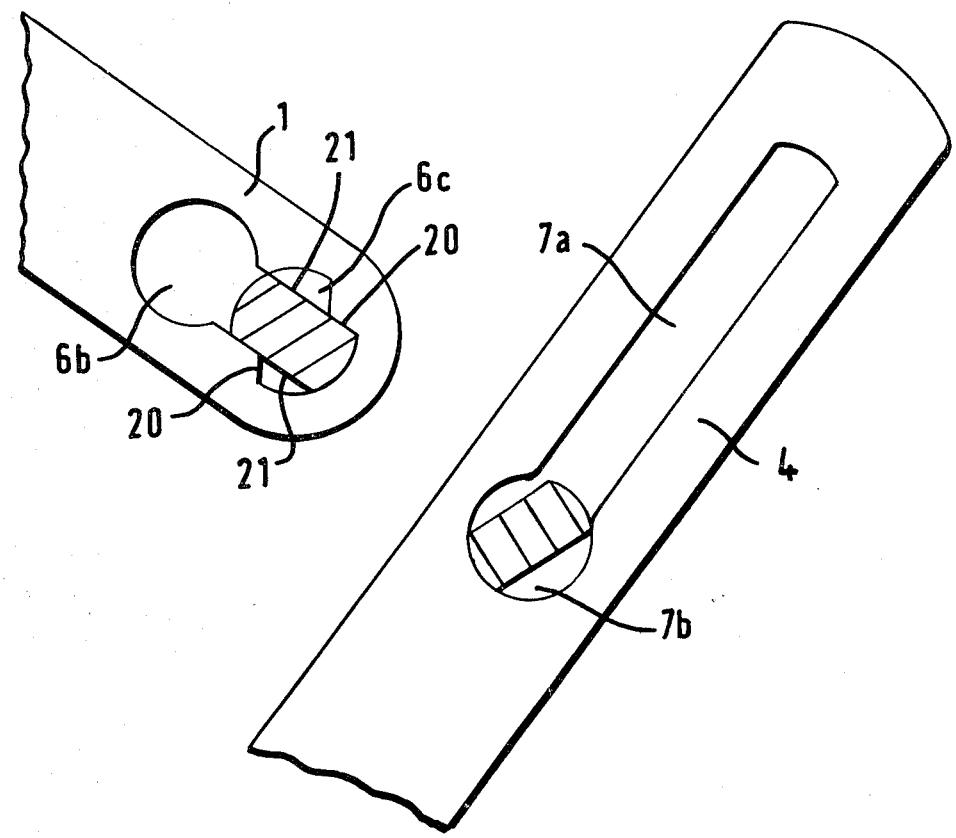

However, when the cab arm 1 reaches the position shown in FIG. 10 the abutments 20 strike the flats 21 to entrain the pin 5 in rotation during further pivoting of the cab and of the cab arm 1. As the cab is raised further, the two arms straighten out to occupy the position illustrated in FIG. 11. During all of this movement the portion 5b of the pin 5 occupies a position in which the flats 22 are not aligned with the straight portion of the slot so that the pin portion 5b cannot enter the straight portion 7a of the slot 7 but instead remains trapped in the circular slot portion 7b.

Figure 11:
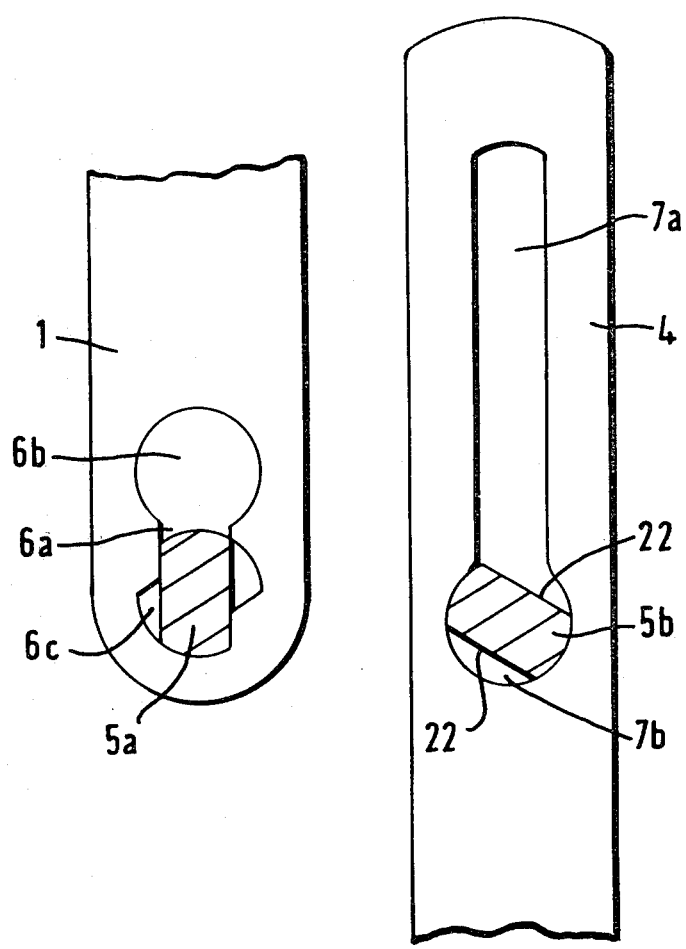

In the position shown in FIG. 11, the cab has been pivoted through slightly more than 40°, the two stay arms are in line, and the cab cannot be raised any further because the pin portion 5a is at that end of slot 6 remote from the pivot point of the cab arm and the flats on pin portion 5b are not aligned with the slot portion 7a. When the cab is released it drops down to a position in which it has been pivoted through an angle of 40° relative to its lowered position. As the cab drops down to its 40° position (see FIG. 12) the arm 1 moves down the pin 5 so that the pin portion 5a enters the circular slot portion 6b by way of the slot portion 6a. This movement is possible because the flats 21 are aligned with the short straight slot portion 6a. In this "40° position", illustrated in FIG. 6 and also called herein a first raised position, the stay is held straight in a first supporting position because it is impossible for the cab arm to pivot in either direction about its circular opening 6b for the reason that the cab arm is against the end wall or web 11 of the channel member 10. In the 40° position the end of the portion 1b of the cab arm 1 abuts the frame arm 4 to bear the weight of the cab and thus prevent the pin 5 from being subjected to excessive shear forces. To prevent the cab from lifting from its first raised position, the pin is pivoted anticlockwise through 60° by means of the pin-operating lever 14, see FIG. 13. This pivoting of the pin is possible because both pin portions lie in their respective circular slot portions 6b and 7b. In the "locked" position of the pin 5, the flats on both pin portions are out of alignment with the straight portions of their slots, so that neither of the stay arms can move up or down the pin and the cab is thus safely supported in its 40° position. This is particularly important if the cab is to be raised to its 40° position in windy conditions or when the vehicle is parked on a downhill slope, since otherwise the stay might accidentally collapse by reverse movement through its positions of FIGS. 12, 11, 10 and 9. It is anticipated that this 40° position giving limited access to parts of the vehicle will be used by the driver of the vehicle for emergency inspection or repair. The driver can readily raise the cab to its 40° position (torsion bar spring bearing assistance, not shown, will be provided) and the driver will be able to return the cab to its lowered position unaided because the cab has not gone "over centre" on its front pivot.

Figures 12, 13:
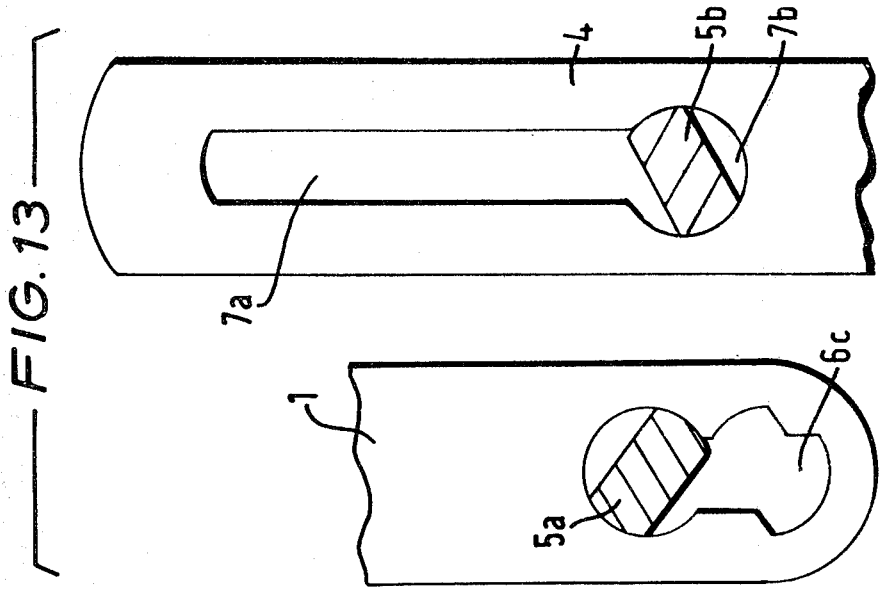
Figure 15:
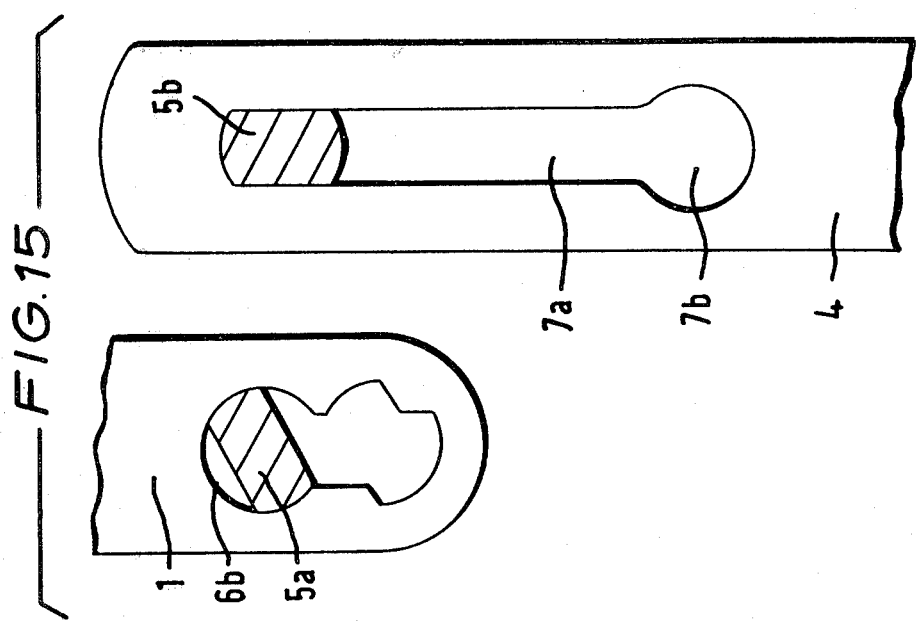
Figure 14:
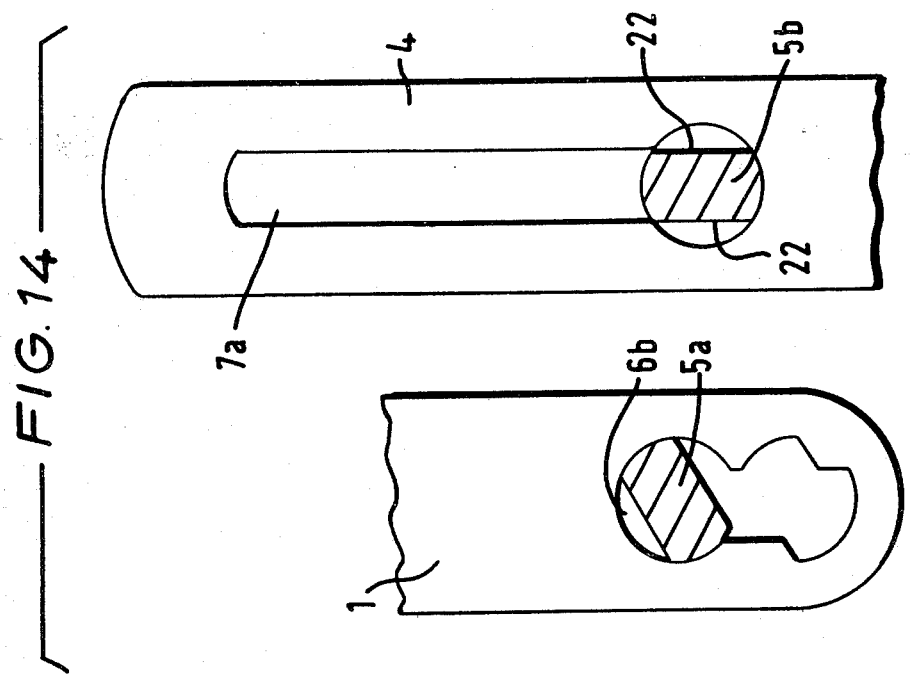

However, by pivoting the pin clockwise by 110° (by means of lever 14) from its locked position, FIG. 13, to its position shown in FIG. 14, it is possible to effectively extend the stay length. In the position shown in FIG. 14, the pin portion 5a will be still retained in the circular slot portion 6b, but the flats 22 of pin portion 5b will be aligned with the straight slot portion 7a so that when the cab is raised further the pin 5 can move up the straight slot portion 7a to the end of slot 7. This position of the stay is shown in FIG. 15 and also FIGS. 7 and 8, and at this time the cab will be in a position in which it has been pivoted through 50° relative to its "cab lowered" position. This position of the cab is termed herein a "50° position", or a "second raised position". The 50° position of the cab of course affords better access to vehicle components than the 40° position, but it has the disadvantage that the stay will be in tension and that it will be difficult or impossible for one man alone to return the cab from its 50° position to its lowered position. The reason for this is that the cab is "over centre" in its 50° position so that the force of gravity must be overcome, and possibly the spring biasing assistance for raising the cab may also have to be overcome. Thus, it is anticipated that the 50° position will only be used when two men are available to return the cab to its lowered position, for example when the vehicle is being serviced in a garage. The cab will not tend to return to its 40° position spontaneously or accidentally, but if it is desired to lock the cab in its 50° position this may be achieved by passing a bolt through the slot portion 7b which in the 50° position is exposed below the bottom of the channel member 10 as shown in FIG. 7.

A particularly advantageous feature of the stay described is that it is impossible for the cab to be moved direct from its lowered position to its fully raised 50° position because in order to reach the 50° position the pin must be deliberately rotated from the position which it always automatically assumes when the cab is lifted to its 40° position from its lowered position.

The process of lowering the cab will now be briefly described. In the 50° position, FIG. 15, the locking bolt (not shown), if used, is first removed from the slot portion 7b. The cab is then pushed down to its 40° position, FIG. 14. The lever 14 is then used to rotate the pin 5 direct to its position shown in FIG. 12. The cab can then be raised slightly so that the pin portion 5a enters the slot portion 6c as shown in FIG. 11. The extreme end region of the cab arm 1 will now not strike against the end wall 11 of the channel member 10 when the stay is collapsed by manually pushing the centre of the stay to the right to allow the cab to be lowered.

It will be noted that there is limited free movement of the pin portion 5a within the part-circular slot portion 6c of the slot 6. When the cab is being lifted, this free play occurs when the stay moves from its position of FIG. 9 to its position of FIG. 10 as described earlier. However, when the cab is being lowered, this free play occurs when the stay is first moved from its position shown in FIG. 11 towards its position shown in FIG. 10.

The slot portion 6c cannot be circular, because in that case the pin would not be rotated when the cab is lifted. If the illustrated embodiment were to be modified by making the slot portion 6c straight, i.e. an extension of the slot portion 6a, then in the collapsed position of the stay, FIG. 9, the flats on the pin portion 5b would be aligned with the straight portion 7a of the slot 7 (if the stop 19 permitted this) so that the pin could run up the slot 7 when the cab was being lifted from its lowered position. The stop 19 shown in full lines in FIG. 1 prevents the pin from being accidentally moved anti-clockwise from its FIG. 9 position to a position in line with slot portion 7a. The other stop 19 shown in dotted lines in FIG. 1 prevents the pin from being rotated clockwise beyond its position of FIG. 14 to a position in which the flats on the pin portion 5a align themselves with the slot portion 6a, which would again cuase incorrect operation of the stay.

In summary, the stay has a collapsed position (FIG. 1), a first supporting position (FIG. 6) in which the stay has a first length, and a second supporting position (FIGS. 7 and 8) in which the stay has a second and longer length, the stay comprising a first arm 1, a second arm 4, a pin 5, and a channel member 10 having two spaced apart side walls, 8, 9 connected by an end wall or web 11, the arms 1, 4 having first end regions to be connected to respective members (i.e. the cab and the frame) between which the stay is to extend, and second end regions formed with longitudinally extending slots 6 and 7, the slotted end regions of the arms overlapping one another and being disposed between the side walls 8 and 9 of the channel member, the pin 5 extending between the side walls 8 and 9 of the channel member and passing through the slots 6 and 7 to thus connect the arms 1 and 4 together, the pin 5 being rotatably mounted and having a first axial portion 5a which lies in the slot 6 in one arm 1, and a second axial portion 5b which lies in the slot 7 in the other arm 4, both axial pin portions 5a and 5b being of non-circular cross-section, and each slot having a wider portion 6b, 7b in which the respective axial pin portion 5a, 5b is freely rotatable, and a narrower slot portion (6a, 6c in the case of arm 1 and 7a in the case of arm 4) in which the respective axial pin portion 5a, 5b is not freely rotatable and which the respective axial pin portion can enter only when correctly aligned therewith, the wider portion 6b, 7b of each slot being at the end thereof remote from the second ends of the respective arms, the arrangement being such that in the collapsed position of the stay the pin 5 passes through a said narrower slot portion 6c of the first arm 1 and through a said wider slot portion 7b of the second arm 4, in the first supporting position of the stay the pin 5 passes through the wider slot portion 6b, 7b of both arms, and in a second supporting position the pin 5 passes through a wider slot portion 6b of the first arm 1 and through a narrower slot portion 7a of the second arm 4.

Briefly the function of the pin 5 is to serve as a member for controlling operation of the stay. In the 40° position of the stay the pin is selectively rotatable to each of three positions, namely a "locking" position in which the stay is locked because neither axial pin portion 5a, 5b is correctly aligned to move from the wider slot portion 6b, 7b in which it lies, a "stay collapse" position in which the first axial pin portion 5a can move from the wider slot portion 6b in which it lies to enable the stay to be collapsed, and a "stay extend" position in which the second axial pin portion can move from the slot portion 7b so that the stay can be extended.

It is to be understood that this invention is not limited to the exact construction illustrated and described above, but that various changes and modifications may be made without departing from the spirit and scope of the invention as defined in the appended claims.

We claim:

1. A tilt cab vehicle having a cab pivotally connected to a frame of the vehicle so that the cab can be pivoted and thus raised from a lowered position which it occupies when the vehicle is to be driven and having a stay comprising a pair of arms pivotally connected to each other and to the cab and frame of the vehicle, the stay being provided for supporting the cab selectively in each of a first raised position in which the cab has been pivoted through a first angle from its lowered position, and a second raised position in which the cab has been pivoted through a second and larger angle from its lowered position and in which, when the cab is in its first raised position and the vehicle stands on a horizontal surface, the arms of the stay supporting the cab directly compressively engage each other at their adjacent ends due to the force of gravity acting on the cab.

2. A tilt cab vehicle according to claim 1, in which when the cab is in its second raised position and the vehicle stands on a horizontal surface, the stay supporting the cab in under tension.

3. A tilt cab vehicle according to claim 1 or 2 wherein means are provided to prevent the cab from being inadvertently moved to its second raised position.

4. A tilt cab vehicle according to claim 3, wherein the arms include means defining slots formed therethrough and including a member movable to control operation of the stay, the control member comprising a pin member rotatably and slidably receivable in the arm slots and having portions engageable with portions of said slots to prevent or permit relative movement therebetween and having a position to which it is automatically moved by movement of the arms when the cab is raised to its first raised position, in which position of the control member movement of the pin member with respect to the arm slots is restrained whereby the cab cannot be raised to its second raised position.

5. A tilt cab vehicle according to claim 4, in which the control member has a further position to which it may be moved selectively, in which further position the stay is locked and the cab cannot be raised or lowered.

6. A tilt cab vehicle according to claim 5, in which the control member can be moved to another position in which the cab can be raised from its first raised position to its second raised position.

* * * * *